US007331050B2

(12) United States Patent
Vuppula

(10) Patent No.: US 7,331,050 B2
(45) Date of Patent: Feb. 12, 2008

(54) SYSTEM AND METHOD FOR COMMUNICATING INFORMATION BETWEEN APPLICATION PROGRAMS

(75) Inventor: Srinivas Vuppula, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 09/876,486

(22) Filed: Jun. 6, 2001

(65) Prior Publication Data

US 2002/0188766 A1 Dec. 12, 2002

(51) Int. Cl.
*G06F 3/00* (2006.01)
(52) U.S. Cl. .................................... 719/318
(58) Field of Classification Search .......... 709/318; 719/318, 310; 710/260
See application file for complete search history.

(56) References Cited

U.S. PATENT DOCUMENTS

| | | | | |
|---|---|---|---|---|
| 5,566,337 | A * | 10/1996 | Szymanski et al. | 710/260 |
| 6,055,441 | A * | 4/2000 | Wieand et al. | 455/557 |
| 6,112,246 | A * | 8/2000 | Horbal et al. | 709/230 |
| 6,124,806 | A * | 9/2000 | Cunningham et al. | 340/870.02 |
| 6,226,693 | B1 * | 5/2001 | Chow et al. | 709/318 |
| 6,259,707 | B1 * | 7/2001 | Dara-Abrams et al. | 370/486 |
| 6,263,457 | B1 * | 7/2001 | Anderson et al. | 714/38 |
| 6,363,434 | B1 * | 3/2002 | Eytchison | 719/313 |
| 6,598,169 | B1 * | 7/2003 | Warwick et al. | 713/320 |
| 6,734,985 | B1 * | 5/2004 | Ochiai | 358/1.15 |
| 6,952,703 | B1 * | 10/2005 | Kathail et al. | 707/102 |
| 2002/0112058 | A1 * | 8/2002 | Weisman et al. | 709/227 |

OTHER PUBLICATIONS

Ray Bell, Directory enable networking within the securities industry, Dec. 4, 1998.*
Distributed Management Task Force,Inc.: Common Information Model (CIM) Specification, Version 2.2, Jun. 14, 1999.
Java™: Remote Method Inovacation Specification, Revision 1.7, Java™ 2SDK, Standard Edition, v1.3.0, Dec. 1999.

* cited by examiner

*Primary Examiner*—William Thomson
*Assistant Examiner*—LeChi Truong
(74) *Attorney, Agent, or Firm*—Blakely, Sokoloff, Taylor & Zafman LLP

(57) ABSTRACT

System and method for providing communications between at least two application programs. In one embodiment, the method may include receiving a registration request from at least one consumer application program, receiving event information regarding at lest one of a plurality of devices from at least one provider application program, and directing the event information to the at least one consumer application program. The method may further include invoking a notify program associated with at least one of the consumer application programs. In one embodiment, a system implementing the invention may include a processor, a memory coupled to the processor via a bus, an event provider interface to receive a plurality of event information from a plurality of provider application programs, an event consumer interface to receive event subscription information from at least one consumer application program, and an event manager to direct event information received via the event provider interface to the consumer application program via the event consumer interface based on the event subscription information.

24 Claims, 4 Drawing Sheets

SYSTEM AND METHOD FOR COMMUNICATING INFORMATION BETWEEN APPLICATION PROGRAMS

BACKGROUND

1. Field of the Invention

The invention relates generally to computer software and, more specifically, to communicating information received from one group of computer application programs to those of a second group of computer application programs to whom the information is pertinent.

2. Background

Computers are ubiquitous in modern society. In many settings such as schools, businesses, and the like, computers may be connected to a network. The network may be local to one facility, such as an intranet or local area network (LAN), may couple computers and devices at multiple locations such as an extranet or wide area network (WAN), or may be a shared public network such as the Internet or other publicly accessible WAN. Each of these networks may provide for the sharing of resources or for the sharing of information about resources such as computers, printers, network access devices, and the like. In various contexts, the resources may be devices such as printers, disk arrays, routers, hubs, etc. or other computers on the network.

A server computer may include multiple processors and multiple devices directly connected to or included in the computer's housing. To keep such a computer running efficiently and without problems, monitoring software may be used to access information about the computer, its devices, and the network it is connected to. Such monitoring software may be particularly helpful if the server computer serves web pages for Internet web sites. To keep a network running efficiently and without problems, monitoring software may be used to monitor the status of network devices such as routers, hubs, etc.; devices on the network such as printers and driver arrays; and computers on the network. The same software may be used to monitor the status of components and devices coupled directly to a computer or within a computer and to monitor other computers and devices connected via a network. In some environments, a systems operator or network manager employed to maintain the computers, networks and devices may be at one location or within a location and may be required to monitor the status of computers and devices in a LAN and/or WAN which may be at another location in the same building or the same campus, or which may be in different cities, states or countries. The person may use monitoring software to view the status of computers and devices in a LAN and/or WAN.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The invention relates to computer software to communicate information received from one group of application programs to those of a second group of application programs to whom the information is pertinent. In one embodiment, provider application programs communicate events which are forwarded to subscribing consumer application programs. In this embodiment, the provider application programs obtain event information from devices coupled with a server computer in which the software executes.

Figure 1:
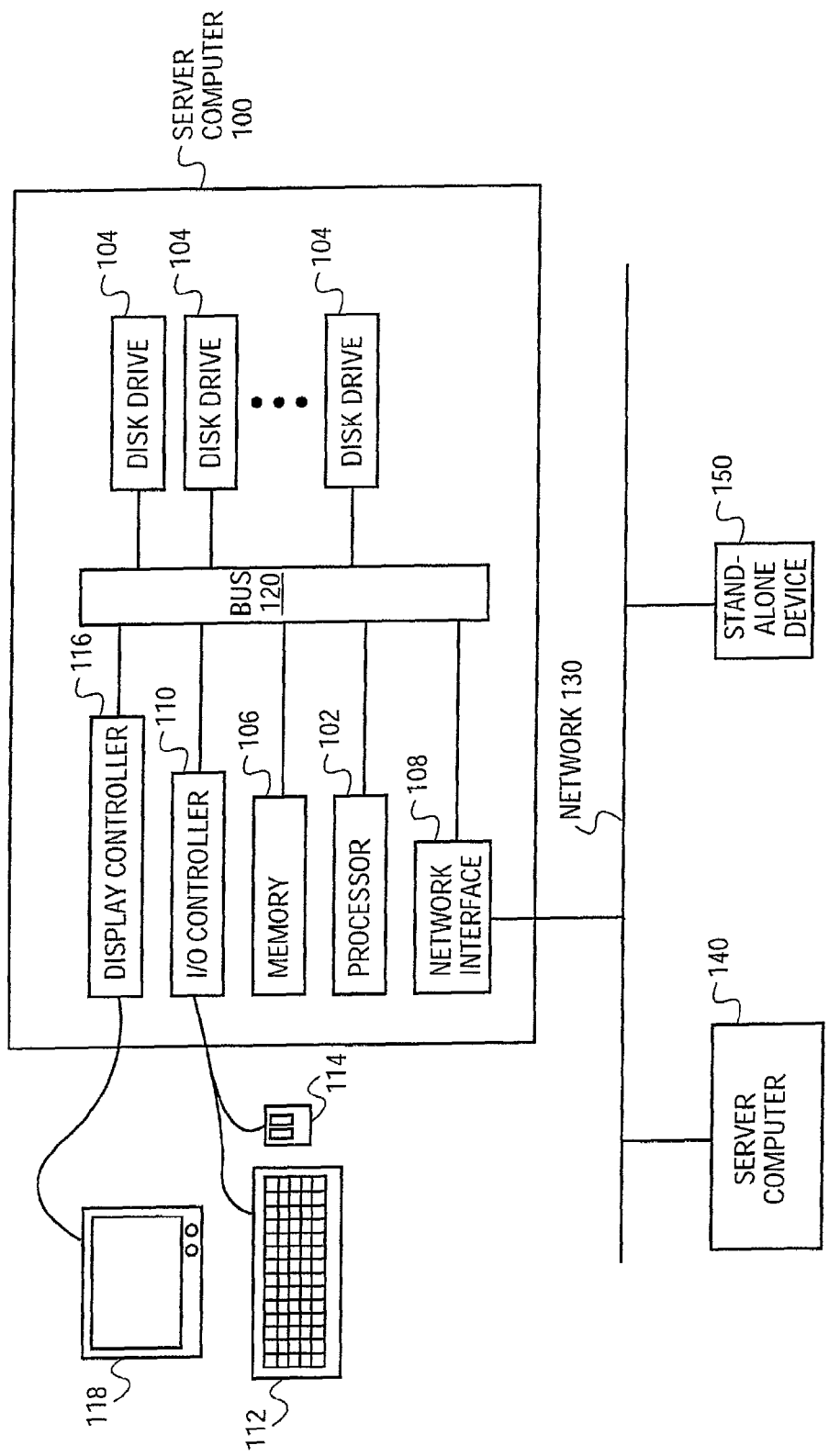
FIG. 1 illustrates a hardware environment in which one embodiment of the invention executes.

FIG. 1 illustrates a hardware environment in which one embodiment of the invention executes. In one embodiment, the invention is embodied in software that is executed by processor 102 and is stored on at least one of disk drives 104 of server computer 100. The processor executes the software of the invention using memory 106. Processor 102 may be any processor. Although only one processor is depicted, multiple processors may be used. Memory 106 may be any form of random access memory (RAM). In other embodiments, the invention may be implemented as hardware or a combination of hardware and software.

Although depicted as disk drive 104, the software of the invention may be stored on and retrieved from any machine readable medium, including, for example, magnetic media such as disk drives and magnetic tape; optical drives such as compact disk read only memory (CD-ROM) and readable and writeable compact disks (CD-RW); stick and card memory devices; programmable read only memory (PROM), RAM, flash memory devices and the like; whether internal, such as disk drive 104, directly coupled, accessible locally or remotely via network 130, and via electrical, optical, acoustical or other form of propagated signals (e.g., carrier waves, infrared signals, digital signals, etc.), such as stand-alone device 150. Stand-alone device 150 may be any machine readable medium capable of network communications, and may also be a network capable printer, a networking device such as, for example, a hub or router, or any other computer peripheral or computer communication device.

Server computer 100 also includes network interface 108 such as a modem or other network connection interface device that provides for any form of network communication that allows for communication with other computers such as server computer 140 and other devices such as stand-alone device 150 over network 130. In one embodiment, network 130 may be a local area network (LAN); in another embodiment, network 130 may be a wide area network (WAN), such as, for example, the Internet. Although only one each of server computer 140 and stand-alone device 150 are depicted, multiple computers and devices may be coupled to network 130.

In addition, server computer 100 may include an input/output (I/O) controller that provides for receipt of user input via user input devices such as, for example, keyboard 112 and mouse 114. Server computer 100 may also include a display controller 116 by which graphical images are produced via display monitor 118. Each of the components in server computer 100 are coupled to and share information via bus 120. Bus 120 may be any bus. Although only one bus is depicted, more than one bus may be used.

Figure 2:
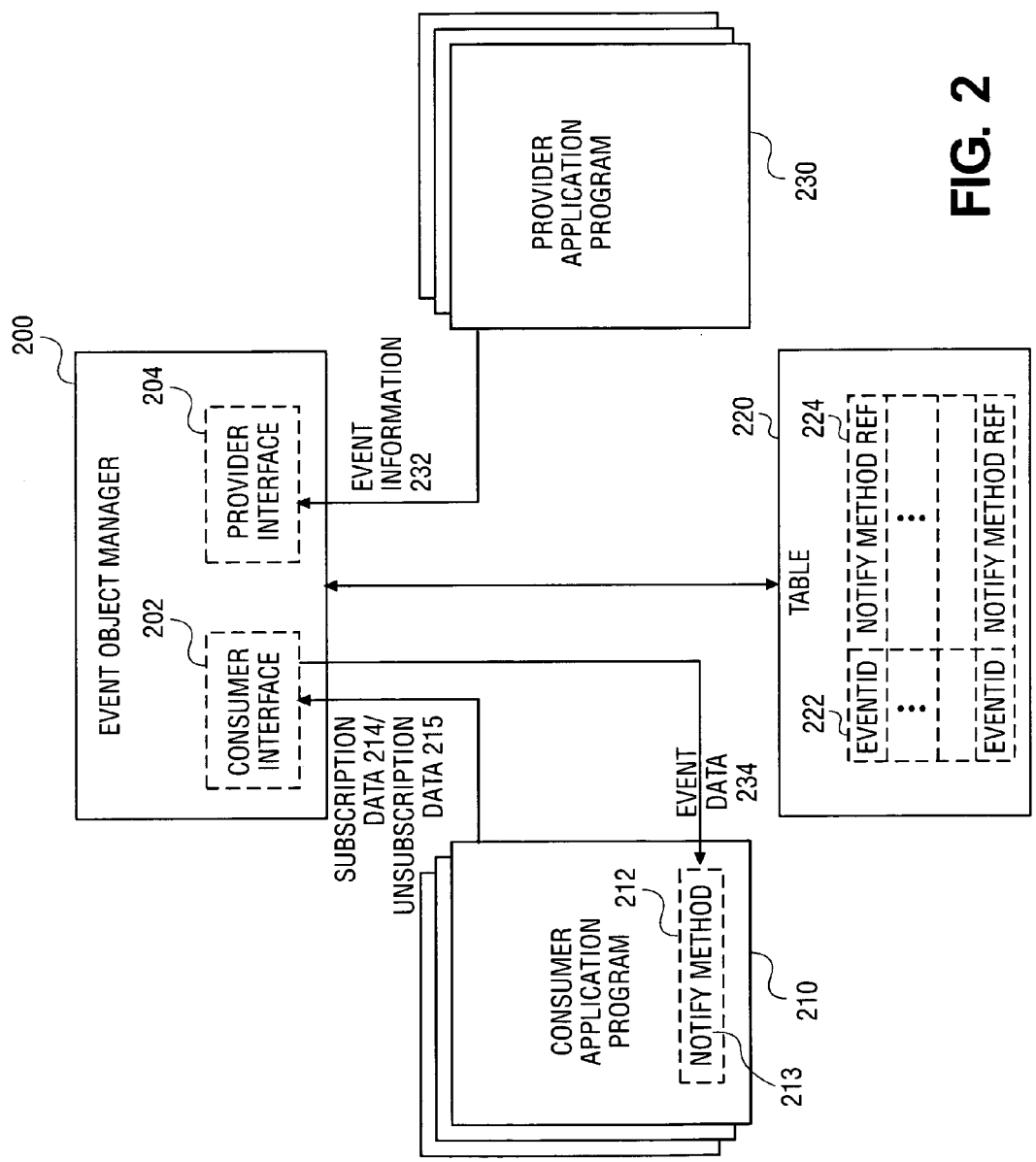
FIG. 2 illustrates a functional block diagram of an embodiment of the invention.

FIG. 2 illustrates a functional block diagram of an embodiment of the invention. The invention may be referred to as an event manager, or, in one embodiment in which the invention may implemented according to object oriented programming constructs, an event object manager (EOM). The invention provides an asynchronous event communication mechanism in a multi-tiered software environment.

Event object manager 200 includes a consumer interface 202 and a provider interface 204. Provider application programs 230 generate events and may be referred to as event providers. The events may be received by the provider application programs from internal or external devices, local or remote devices, as well as other computers coupled via a network or other connection. Consumer application programs 210 are event consumers.

EOM 200 receives registration requests that include subscription data 214 from consumer application programs 210 via consumer interface 202. In one embodiment, the subscription data 214 may include a designated event about which a consumer application program 210 wishes to be notified, and a sink object 212 that includes a notify method 213 or reference to a notify procedure which will be invoked by EOM 200 when EOM 200 receives the designated event. In one embodiment, upon receipt of a registration request and corresponding subscription data 214, EOM 200 updates table 220, storing the designated event in the form of an event identifier 222 and corresponding notify method reference 224. In one embodiment, EOM 200 maintains table 220 indexed by event identifiers 222 such that when an event is received from an event provider such as provider application programs 230, the pertinent corresponding notify method or methods is/are invoked. In one embodiment, multiple consumer application programs may subscribe to a particular event such that multiple notify method references 224 may be associated with an event in table 220. In one embodiment, a consumer application program identifier may be included with the notify method reference. In another embodiment, EOM 200 may also maintain a list of those subscribing consumer application programs for each event identifier in table 220.

EOM 200 receives event information 232 from provider application programs 230 via provider interface 204. Provider application programs 230 may constantly or periodically monitor devices and fire events in appropriate circumstances such as when the condition or status of a device changes. Examples of condition or status include performance of the system, parameters of a device, memory overflow, data changes, etc. When EOM 200 receives events from provider application programs, the event is looked up in table 220 and corresponding notify methods are invoked which cause consumer application programs 210 to receive event data 234. The consumer application programs then take appropriate actions based on the event(s) received.

EOM 200 is a manager that maps the provider event to registered consumer applications. EOM 200 maintains table 220 and updates the table as consumer applications register or unregister. In one embodiment, EOM 200 also receives unregistration requests that include unsubscription data 215 from consumer application programs 210. In various embodiments, the unregistration request may include a request for unsubscription of a particular specified event or events, or of all events subscribed to by the consumer application program.

In one embodiment, using object oriented programming constructs, EOM 200 implements a provider object and exposes a provider interface by which provider application programs communicate with EOM 200. In this embodiment, the provider interface supports ProvideEvent method passing in which the ProvideEvent method includes event information that includes event specific data and an event name or event identifier. Provider application programs use the provide interface by invoking the ProvideEvent method with event data to deliver an event to the EOM. In this embodiment, the consumer interface implements a consumer object and supports SubscribeEvent method passing in which the SubscribeEvent method includes an event name or event identifier and a sink object that includes a notify method.

Figure 3:
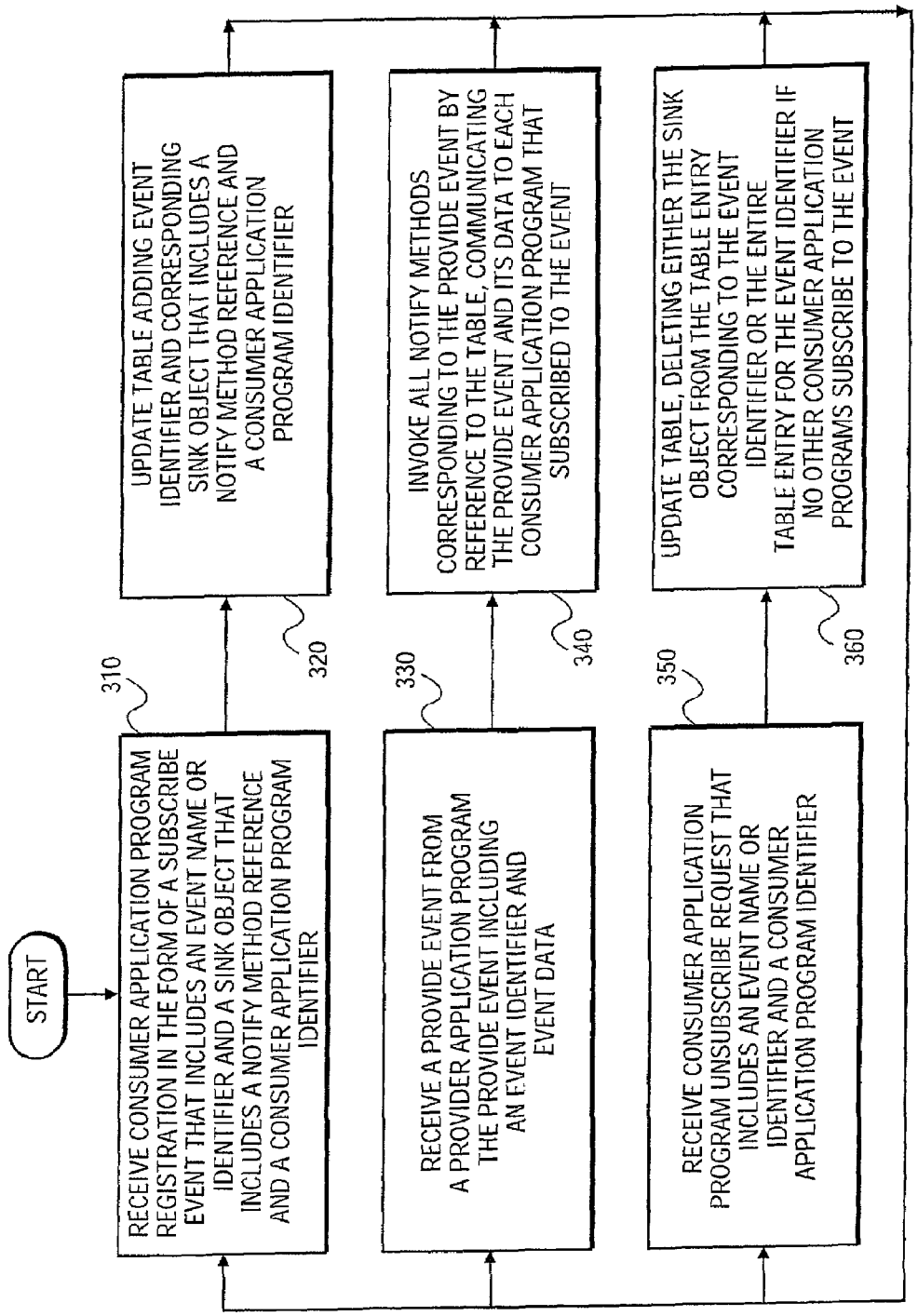
FIG. 3 illustrates a flow of actions taken pursuant to one embodiment of the invention.

FIG. 3 illustrates a flow of actions taken pursuant to one embodiment of the invention. In one embodiment, the EOM may be a method implemented as software. The EOM may receive a consumer application program registration in the form of a subscribe event that includes an event name or identifier and a sink object that includes a notify method reference and a consumer application program identifier, as shown in block 310. The consumer application program identifier may be combined as part of the sink object or may exist independently. The EOM updates a table, adding the event identifier and corresponding sink object that includes a notify method reference and a consumer application program identifier, as shown in block 320. In one embodiment, the consumer application program identifier may not be explicitly present and may be inferred from and/or otherwise included as part of the notify method reference. The EOM may receive additional and multiple registrations from multiple consumer application programs. Execution may then continue at block 330 or return to block 310.

The EOM may receive a provide event from a provider application program, including an event identifier and event data, as shown in block 330. The EOM then invokes all notify methods corresponding to the provide event by reference to the table, communicating the provide event and its data to each consumer application program that subscribed to the event, as shown in block 340. Execution may then return to block 330 or block 310, or continue at block 350.

In one embodiment, the EOM may receive a consumer application program unregistration request in the form of an unsubscribe event that includes an event name or identifier and a consumer application program identifier, as shown in block 350. The EOM may then update the table, either deleting the sink object (that may include a notify method reference and a consumer application program identifier) from the table, or, if no other consumer application programs subscribe to the event, deleting the entire table entry for the event identifier, as shown in block 360. Execution may then return to block 310, block 330, or block 350.

Figure 4:
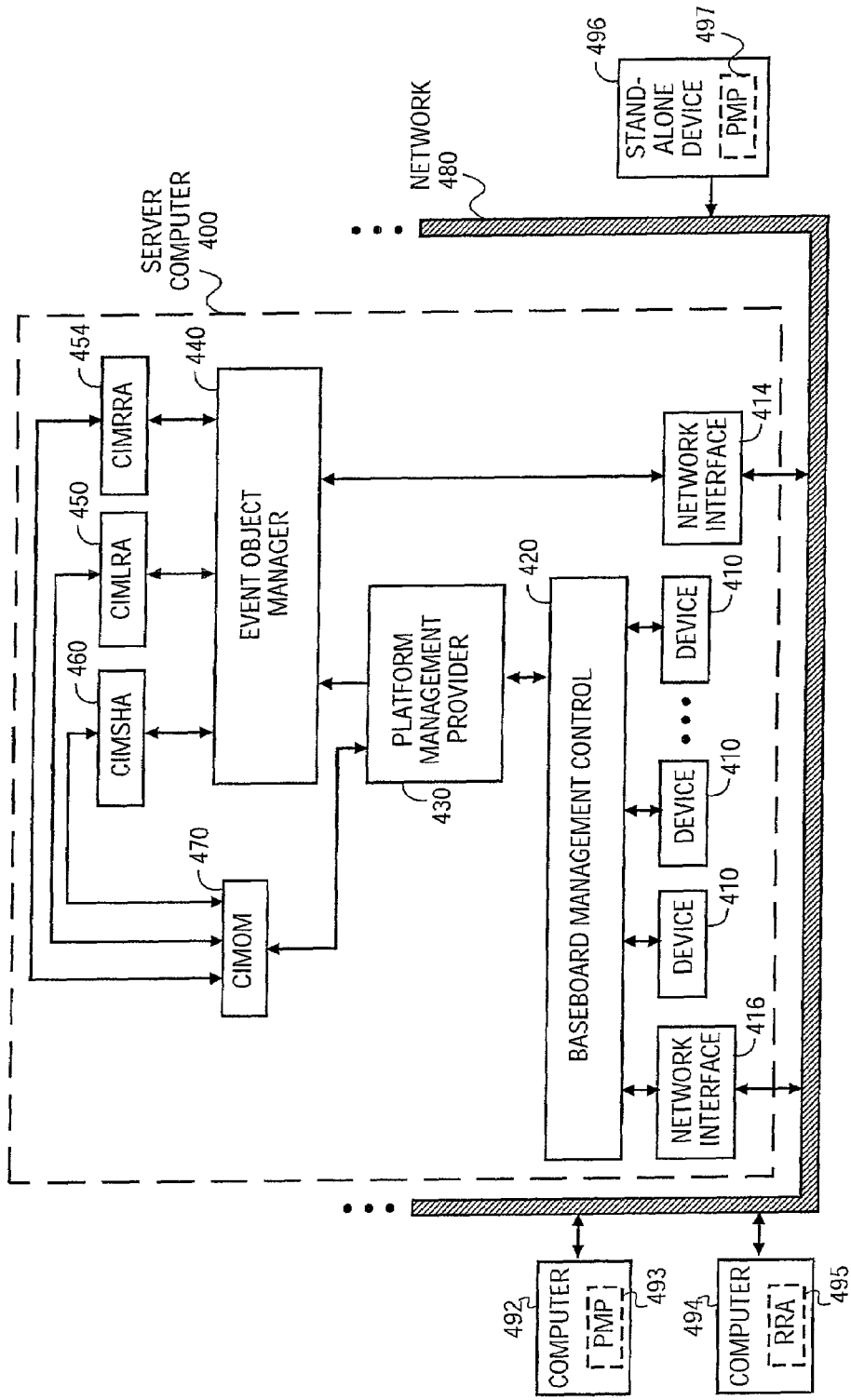
FIG. 4 illustrates a functional block diagram of an embodiment of the invention.

FIG. 4 illustrates a functional block diagram of an embodiment of the invention. In one embodiment, the EOM described herein may be used to provide event information to server control platform instrumentation software that is used to manage server computers. In this embodiment the server control platform instrumentation software may be compatible with an international standard referred to as the Common Information Model (CIM) specification, Version 2.2 Jun. 14, 1999 (the "CIM Specification") of the Distributed Management Task Force, Inc. (DMTF). In one embodiment, the various components may be implemented in the JAVA® programming language and runtime environment, and the EOM described herein may also be implemented in the JAVA® programming language. The invention described herein may execute on computers running various operating systems, such as, for example, Linux, UNIX®, MICROSOFT WINDOWS®, etc.

In one embodiment, various devices 410 may be monitored by platform management provider software 430. The devices 410 are coupled with platform management provider 430 via baseboard management control (BMC) 420 that is included in firmware and that includes drivers for the various devices. In this embodiment, an object manager conforming to the CIM Specification known as CIMOM 470 lacks the capability of handling events. CIMOM 470 is used exclusively by consumer application programs to receive non-event data.

In this embodiment, the server control platform instrumentation software may be implemented on top of a stack that comprises provider application programs in the form of platform management provider 430 that continuously monitors events through BMC 420. In one embodiment, consumer application programs such as a local response agent conforming to the CIM Specification (CIMLRA) 450 and a server health agent conforming to the CIM Specification (CIMSHA) 460 may register with and subscribe to events with EOM 440. The platform management provider 430 communicates event information to CIMHSA 460 and CIMLRA 450 via the event mechanism provided by EOM 440.

Platform management provider 430 monitors changes in and/or the status of the devices and reports to consumer application programs CIMLRA 450 and CIMSHA 460 through events via EOM 440. Based on the events received, consumer application programs CIMLRA 450 and CIMSHA 460 may execute appropriate management operations such as paging a system operator or network administrator, shutting down the system, sending an electronic mail message to a system operator or network administrator, spinning down a disk drive, restarting a disk drive, reconfiguring a device, etc. In this embodiment, the consumer applications like CIMLRA 450 and CIMSHA 460 register with EOM 440 to receive particular specified events. EOM 440 will direct these events to corresponding consumer application programs by, in one embodiment, invoking a notify method of a sink object as discussed above, so that the consumer application programs may then take appropriate actions like paging, sending mail, broadcasting message, shutdown, reboot, etc.

In one embodiment, one or more modems or other network connection devices such as network interfaces 416 and 414 allow for communication with and receipt of events via network 480 from platform management providers on other computers such as PMP 493 on computer 492 and from platform management providers on stand-alone devices such as PMP 497 or stand-alone device 496. In this embodiment, a remote response agent conforming to the CIM specification (CIMRRA) 454 may register for and receive events occurring on and generated by devices and computers coupled to server computer 400 via network 480. In this embodiment, consumer application programs such as CIMSHA 460, CIMLRA 450 and CIMRRA 454 of server computer 400 can monitor the status not just of events occurring on devices 410, but of events occurring on network connected devices and computers such as stand-alone device 496 and computer 492. In this embodiment via these and other consumer application programs, a network operator or system administrator at server computer 400 can monitor and/or be notified regarding the status not just of events occurring on devices 410, but of events occurring on network connected devices and computer such as stand-alone device 496 and computer 492.

In one embodiment, computer 494 which includes a remote response agent such as RRA 495 may register with and receive events from EOM 440. In this embodiment, RRA 495 can monitor the status of remote events received from remote providers on network connected devices and computers such as, for example, stand-alone device 496, computer 492 and computer server 400. In this embodiment, a network operator or system administrator at computer 494 can monitor and/or be notified regarding the status not just of events occurring on computer 494, but events at network connected devices and computers such as stand-alone device 496, computer 492 and server computer 400.

In one embodiment, external devices and computers such as computer 492, computer 494 and stand-alone device 496 issue events which are received by EOM 440 directly from network interface 414. In another embodiment, external devices and computers such as computer 492, computer 494 and stand-alone device 496 issue events which are received by EOM 440 from platform management provider 430 via baseboard management control 420 and network interface 416. In this embodiment, the events received via network interface 416 are treated the same as events from devices 410, even though the true content is an event from a network connected device rather than a local device.

In various embodiments, EOM 440 may be implemented according to well known constructs such as the Component Object Model (COM) or Remote Method Invocation (RMI) protocol available on the JAVA® platform. In these embodiments, network monitoring, device monitoring, and other similar consumer applications similar to CIMSHA 460 and CIMRRA 454 may register with EOM as consumers for management of the server or network. For example, in one embodiment in which the EOM works as an RMI server, the EOM exposes consumer objects and provider objects to provider application programs and consumer application programs on network connected computers and stand-alone devices. In this embodiment, network connected provider application programs such as, for example, PMP 493, and network connected consumer application programs, such as, for example RRA 495, are RMI client applications.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:

receiving a registration request from at least one consumer application program regarding at least one device remote from the at least one consumer application program;

receiving event information regarding at least one event fired by at least one provider application program according to monitoring of the at least one remote device;

directing the event information regarding the at least one remote device to the at least one consumer application program based on the registration request;

when subsequent event information is received from the provider application program according to subsequent monitoring of the at least one remote device, directing the subsequent event information to the consumer application program if an unregistration request has not been received from the at least one consumer application program; and deleting a stored reference to a notify method associated with the consumer application program if an unregistration request is received from the at least one consumer application program to prohibit the directing of subsequent event information to the consumer application program;

wherein the registration request comprises notification information; and wherein receiving the registration request comprises adding the notification information to an internal table based on the registration request;
wherein the notification information comprises:
at least one event identifier to identify at least one event about which the consumer application is to be notified; and
a notify procedure reference for each event identifier, the notify procedure to be invoked upon receiving event information.

2. The method of claim 1 wherein directing comprises: invoking a notify procedure associated with the at least one of the consumer application program.

3. The method of claim 2 wherein invoking comprises: retrieving a reference to the notify procedure from an internal table.

4. The method of claim 1 wherein:
the registration request comprises a sink object.

5. The method of claim 4 wherein the sink object comprises a notify method.

6. The method of claim 1 wherein the notification information further comprises:
a consumer application program identifier.

7. The method of claim 1 wherein the event information comprises:
an event identifier; and
a plurality of event data.

8. A method comprising:
receiving a subscribe event from at least one consumer application program regarding at least one device remote from the at least one consumer application program;
updating a table based on the subscribe event to store a reference to a notify method associated with the consumer application program;
receiving event information regarding at least one provide event fired by at least one provider application program according to monitoring of the at least one remote device;
invoking the notify method associated with the consumer application program to direct the event information regarding the at least one remote device to the at least one consumer application program based on the contents of the table and responsive to receiving the provide event;
when subsequent event information is received from the provider application program according to subsequent monitoring of the at least one remove device, invoking the notify method associated with the consumer application program to direct the subsequent event information to the consumer application program if an unregistration request has not been received from the at least one consumer application program; and
deleting the stored reference to the notify method associated with the consumer application program from the table if an unregistration request is received from the at least one consumer application program;
wherein the registration request comprises notification information; and wherein receiving the registration request comprises adding the notification information to an internal table based on the registration request;
wherein the notification information comprises:
at least one event identifier to identify at least one event about which the consumer application is to be notified; and
a notify procedure reference for each event identifier, the notify procedure to be invoked upon receiving event information.

9. The method of claim 8 wherein receiving the subscribe event is achieved via an event consumer interface; and wherein receiving the provide event is achieved via an event provider interface.

10. The method of claim 8 wherein the at least one consumer application program conforms to the Common Information Model (CIM) of the Distributed Management Task Force, Inc. (DMTF).

11. The method of claim 8 wherein the contents of the table comprise:
a plurality of event identifiers; and
a plurality of notify procedure references associated with the event identifiers.

12. The method of claim 11 wherein the contents of the table further comprise:
a plurality of consumer application program identifiers associated with the event identifier.

13. A system comprising:
a processor;
a memory coupled to the processor via a bus;
an event provider interface to periodically receive event information regarding at least one event fired by at least one provider application program according to monitoring of at least one device remote from the at least one consumer application program;
an event consumer interface to receive event subscription information from the at least one consumer application program regarding the at least one remote device; and
an event manager to direct event information regarding the at least one remote device that is periodically received by the event provider interface to the at least one consumer application program via the event consumer interface based on the event subscription information if an unregistration request has not been received from the at least one consumer application program, the event manager to delete a stored reference to a notify method associated with the consumer application program from the event consumer interface if the unregistration request is received from the at least one consumer application program;
wherein the registration request comprises notification information; and wherein receiving the registration request comprises adding the notification information to an internal table based on the registration request;
wherein the notification information comprises:
at least one event identifier to identify at least one event about which the consumer application is to be notified; and
a notify procedure reference for each event identifier, the notify procedure to be invoked upon receiving event information.

14. The system of claim 13 further comprising:
an internal table by which the event manager maintains the event subscription information.

15. The system of claim 13 wherein the event manager directs the event data to those consumer application programs that subscribed to a particular event.

16. A system comprising:
a processor;
a memory coupled to the processor via a bus;
means for communicating with at least one consumer application program to receive event subscription information regarding at least one device remote from the at least one consumer application program;
means for periodically receiving event information regarding at least one event fired by at least one provider application program according to monitoring of the at least one remote device;

means for directing the periodically received event information regarding the at least one remote device to the at least one consumer application program via the means for communicating based on the event subscription information if an unregistration request has not been received from the at least one consumer application program; and means for deleting a stored reference to a notify method associated with the consumer application program if an unregistration request is received from the at least one consumer application program to prohibit the directing of subsequent event information to the consumer application program;

wherein the registration request comprises notification information; and wherein receiving the registration request comprises adding the notification information to an internal table based on the registration request;

wherein the notification information comprises:

at least one event identifier to identify at least one event about which the consumer application is to be notified; and a notify procedure reference for each event identifier, the notify procedure to be invoked upon receiving event information.

17. The system of claim 16 wherein the means for directing comprises:

means for maintaining an internal table to store the event subscription information.

18. The system of claim 16 wherein the means for directing communicates the event data to those consumer application programs that subscribed to a particular event.

19. A computing device comprising a machine readable medium and a processor, the machine readable medium including instructions which when executed by the processor cause the processor to perform operations comprising:

registering at least one consumer application program according to a registration request regarding at least one device remote from the at least one consumer application program;

receiving event information regarding at least one event fired by at least one provider application program according to monitoring of the at least one remote device;

directing the event information regarding the at least one remote device to the at least one consumer application program;

when subsequent event information is received from the provider application program according to subsequent monitoring of the at least one remote device, directing the subsequent event information to the consumer application problem, if an unregistration request has not been received from the at least one consumer application program; and deleting a stored reference to a notify method associated with the consumer application program if an unregistration request is received from the at least one consumer application program to prohibit the directing of subsequent event information to the consumer application program;

wherein the registration request comprises notification information; and wherein receiving the registration request comprises adding the notification information to an internal table based on the registration request;

wherein the notification information comprises:

at least one event identifier to identify at least one event about which the consumer application is to be notified; and a notify procedure reference for each event identifier, the notify procedure to be invoked upon receiving event information.

20. The computing device of claim 19 wherein directing comprises:

invoking a notify procedure registered by the at least one of the consumer application program.

21. The computing device of claim 19 wherein registering comprises:

receiving the registration request from at least one consumer application program;

adding notification information to an internal table based on the registration request.

22. A computing device comprising a machine readable medium and a processor, the machine readable medium including instructions which when executed by the processor cause the processor to perform operations comprising:

receiving a subscribe event from at least one consumer application program regarding at least one device remote from the at least one consumer application program;

updating a table based on the subscribe event to store a reference to a notify method associated with the consumer application program;

receiving event information regarding at least one provide event fired by at least one provider application program according to monitoring of the at least one remote device;

invoking the notify method associated with the consumer application program to direct the event information regarding the at least one remote device to the at least one consumer application program based on the contents of the table and responsive to receiving the provide event;

when subsequent event information is received from the provider application program according to subsequent monitoring of the at least one remote device, invoking the notify method associated with the consumer application program to direct the subsequent event information to the consumer application program if an unregistration request has not been received from the at least one consumer application program; and deleting the stored reference to the notify method associated with the consumer application program from the table if an unregistration request is received from the at least one consumer application program;

wherein the registration request comprises notification information; and wherein receiving the registration request comprises adding the notification information to an internal table based on the registration request;

wherein the notification information comprises:

at least one event identifier to identify at least one event about which the consumer application is to be notified; and a notify procedure reference for each event identifier, the notify procedure to be invoked upon receiving event information.

23. The computing device of claim 22 wherein receiving the subscribe event is achieved via an event consumer interface; and wherein receiving the provide event is achieved via an event provider interface.

24. The computing device of claim 22 wherein the at least one consumer application program conforms to the Common Information Model (CIM) of the Distributed Management Task Force, Inc. (DMTF).

* * * * *